United States Patent [19]
Föhl

[11] Patent Number: 5,653,398
[45] Date of Patent: Aug. 5, 1997

[54] DRIVE DEVICE FOR A BELT PRETENSIONER

[76] Inventor: Artur Föhl, Auf der Halde 28, 73614 Schorndorf, Germany

[21] Appl. No.: 596,260

[22] PCT Filed: Jun. 21, 1995

[86] PCT No.: PCT/EP95/02398

§ 371 Date: Feb. 8, 1996

§ 102(e) Date: Feb. 8, 1996

[87] PCT Pub. No.: WO95/35227

PCT Pub. Date: Dec. 28, 1995

[30] Foreign Application Priority Data

Jun. 22, 1994 [DE] Germany .................. 44 21 758.7

[51] Int. Cl.[6] .................. B65H 75/48; A62B 35/00
[52] U.S. Cl. .................. 242/374
[58] Field of Search .................. 242/374; 280/806, 280/807

[56] References Cited

U.S. PATENT DOCUMENTS

| | | | |
|---|---|---|---|
| 1,539,728 | 5/1925 | Ensign | 242/374 |
| 4,230,288 | 10/1980 | Fohl | 242/374 |

FOREIGN PATENT DOCUMENTS

| | | |
|---|---|---|
| 0424104 | 4/1991 | European Pat. Off. . |
| 0648652 | 4/1995 | European Pat. Off. . |
| 2467970 | 4/1981 | France . |
| 96755 | 4/1973 | German Dem. Rep. . |
| 24 60 119 | 6/1976 | Germany .................. 242/374 |
| 2544232 | 7/1976 | Germany . |
| 2512433 | 9/1976 | Germany . |
| 2535380 | 2/1977 | Germany . |
| 9415157 | 11/1994 | Germany . |
| 58-117382 | 7/1983 | Japan . |

*Primary Examiner*—John P. Darling
*Attorney, Agent, or Firm*—Tarolli, Sundheim, Covell, Tummino & Szabo

[57] ABSTRACT

A drive device for a belt pretensioner is of the lamella motor type and its rotor (16) can be directly joined to the belt drum of a belt retractor. In the resting state the lamellas (20) are retracted into radial slots (18) of the rotor (16) so that they do not come into contact with the housing wall. At the radially inner end thereof the lamellas possess a larger pressurized area than at the outer end and on activation of the gas generator by the pressure built up by a blowout patch (54) at the outlet (30) they are thrust radially outward into sealing engagement with the wall of the housing (12).

12 Claims, 4 Drawing Sheets

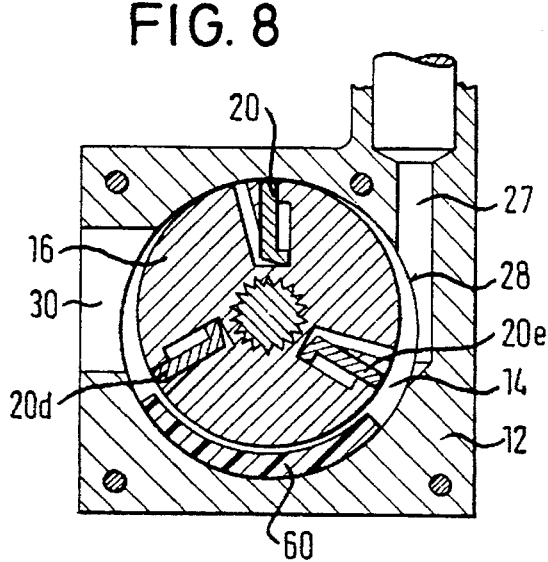
FIG. 8
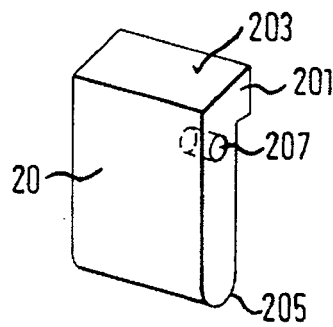
FIG. 9
FIG. 9a
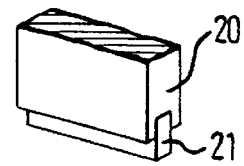
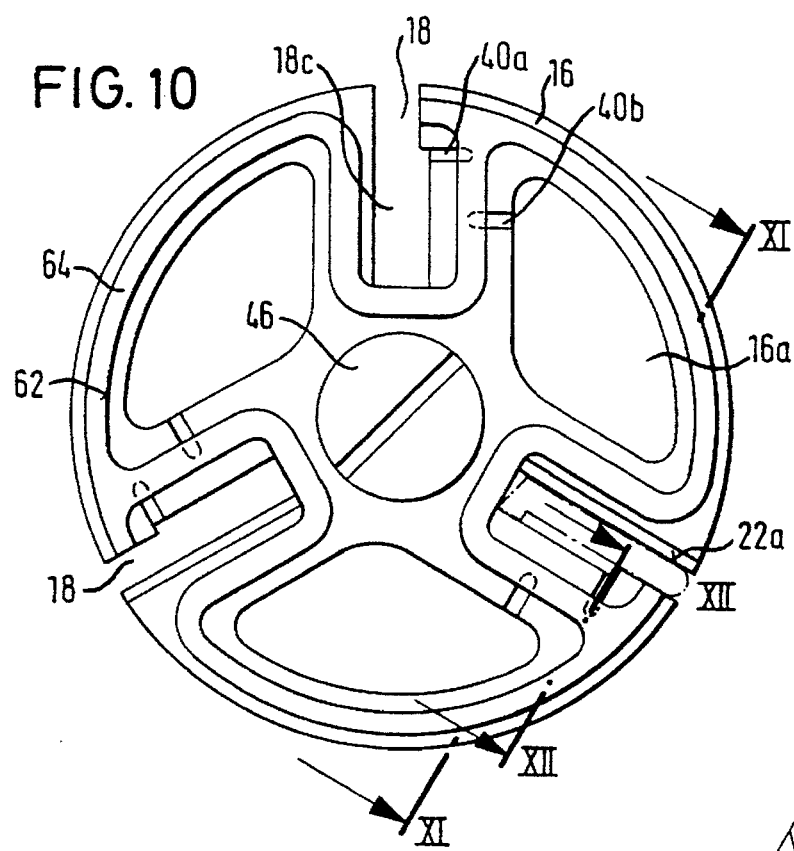
FIG. 10
FIG. 11
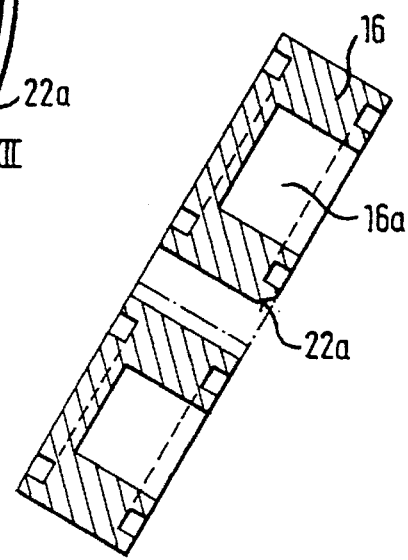
FIG. 12
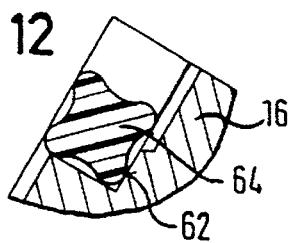

DRIVE DEVICE FOR A BELT PRETENSIONER

The invention relates to a drive device for a belt pretensioner adapted to act on the belt drum of a belt retractor, comprising a housing fitted laterally to the belt retractor and in which a cylinder space is formed, a generally circular disk-like rotor rotatably and eccentrically mounted in such cylinder space and having lamellas arranged in radial slots, and a compressed gas source adapted to be a activated in a manner responsive to the vehicle, for pressurizing chambers formed between the lamellas, the rotor and the wall of the housing via an inlet.

A drive device of this type has already been disclosed in the German patent publication 2,814,487 C. Since the rotor of this drive device, which may be termed a lamella motor, can be directly coupled with the belt drum of the belt retractor, there is an efficient use of the energy made available by the compressed gas source as compared with other designs of belt pretensioner drives, in the case of which linear motion must firstly be converted into a rotary movement. In said drive device the compressed gas source, a pyrotechnic gas generator, does not however directly pressurize the chambers formed between the lamellas of the rotor, but rather using a liquid drive means such as water, since it had not been possible to sufficiently seal off the rotor in the housing. In the case of conventional lamella motors the lamellas thereof are thrust by compression springs radially outward to be in sealing engagement with the housing wall. On an increase in the speed of rotation of the rotor the lamellas are additionally thrust by centrifugal force against the housing wall. However in the case of a drive device for a belt pretensioner the rotor must turn through 1 to 2 and preferably 1.5 revolutions within only approximately 6 to 10 ms, something corresponding to a mean speed of rotation of 10,000 to 20,000 rpm. With the sudden increase in pressure required for this after activation of the gas generator the lamellas are also put under pressure at their outer end surfaces, which are to make sealing engagement with the housing wall, this meaning that massively dimensioned springs, which are to hold the lamellas in sealing engagement with the housing wall, are overridden so that ultimately there is no sealing action or only an insufficient one and the gases will escape at the outlet of the housing without having performed any work. By arranging a liquid working medium, such as water, in between there is admittedly an improved conversion of the energy released by the gas generator into mechanical drive work, since owing to the viscosity of such medium, which is higher than that of gases, leakage at the rotor is less significant, but the use of such a medium gives rise to problems for a number of different reasons. On the one hand the liquid working medium must be accommodated in an efficiently sealed supply space and be constantly kept available so that a complex structure with a larger volume and weight is called for. On the other hand measures must be adopted to prevent undesired effects due to escape of working medium at the outlet of the housing during activation of the belt pretensioner drive.

The invention is to provide a drive device of the lamella motor type, which makes do without a liquid working medium while nevertheless ensuring optimum conversion of the energy released by the gas generator into mechanical drive work. In accordance with the invention the radial slots of the rotor, in which the lamellas run, are respectively connected at inner ends thereof by a flow duct with a chamber placed in the direction of the rotation of the rotor before the respective lamella. By having such a flow duct there will be pressure equalization between the pressurized chamber and the radially inner end of each slot so that the radial forces produced by the application of pressure at each lamella will compensate one another. It is now only necessary to ensure that at the start of pressurization the lamellas are either already in sealing engagement with the housing wall or however are brought into sealing engagement with the housing, wall within an extremely short period of time.

In accordance with a first embodiment, in which the rotor is adapted to be coupled with the belt drum by means of a coupling, that one of the lamellas which terminates the inlet side chamber at its front end in terms of the direction of rotation of the rotor, is held at the radially outer end thereof in sealing engagement with the wall of the housing by holding means only yielding at a substantially increased pressure. Owing to this measure it is possible to ensure that such sealing engagement is maintained even when, on activation of the gas generator, a pressure differential occurs between the pressurized chamber and the radially inner ends of the rotor slots, when there is as yet no complete equalization of pressure through the flow ducts in the rotor. It is only when a substantial percentage, for example 10%, of the maximum pressure has been reached, that holding means, as for example a shear pin, is overridden; at this point in time experience has shown that pressure equalization via the flow ducts will have occurred so that no radial differential forces, occasioned by pressurization occur at the lamellas.

In accordance with a second embodiment the rotor is coupled with the belt drum in such a manner as to prevent relative rotation so that no coupling is required. The lamellas each have a larger surface able to be acted upon by the gas pressure at their radially inner ends than at their radially outer ends. On pressurization of the radially inner and outer end surfaces of the lamellas there is accordingly a force differential, which is directed radially outward and certainly brings the lamellas into sealing engagement with the housing wall. In order to ensure that right from the start of pressurization, even before a complete pressure equalization has taken place through the flow ducts in the rotor, the desired force differential at the lamellas will be built up, in the case of a preferred further development of this embodiment an obstructing body is arranged is arranged in the flow path between the inlet and the outlet, which is generally diametrally opposite to it, in the housing, such obstructing body only yielding when there is a substantial pressure increase and then clearing the flow path. This obstructing body may be embodied in the form of a blowout patch closing the outlet or a filling plug, made of a deformable material, in that chamber, which considered in the direction of the rotation of the rotor is behind the chamber adjacent the inlet. In order to ensure that rotation of the belt drum is not obstructed in any way, in the inactive position of the rotor, the lamellas are drawn radially into the slots and do not extend past the outer periphery of the rotor so that they do not come into contact with the housing wall. In this retracted setting the lamellas are preferably releaseably attached to the rotor, for example by means of an adhesive.

Further features and advantages of the invention will be gathered from the following description of several embodiments thereof and from the drawings, to which reference is to be had and in which:

FIG. 8 is a sectional view taken through a modified form of the embodiment of FIG. 5.

FIG. 9 is a perspective view of a single lamella.

FIG. 9a shows a specially adapted embodiment of a lamella.

FIG. 10 shows a lateral elevation of the rotor in the case of a further embodiment of the drive device.

FIG. 11 is a sectional view taken on the line XI—XI of FIG. 10.

FIG. 12 shows a detailed section of the structure of FIG. 10 taken on the line XII—XII.

Figure 13:
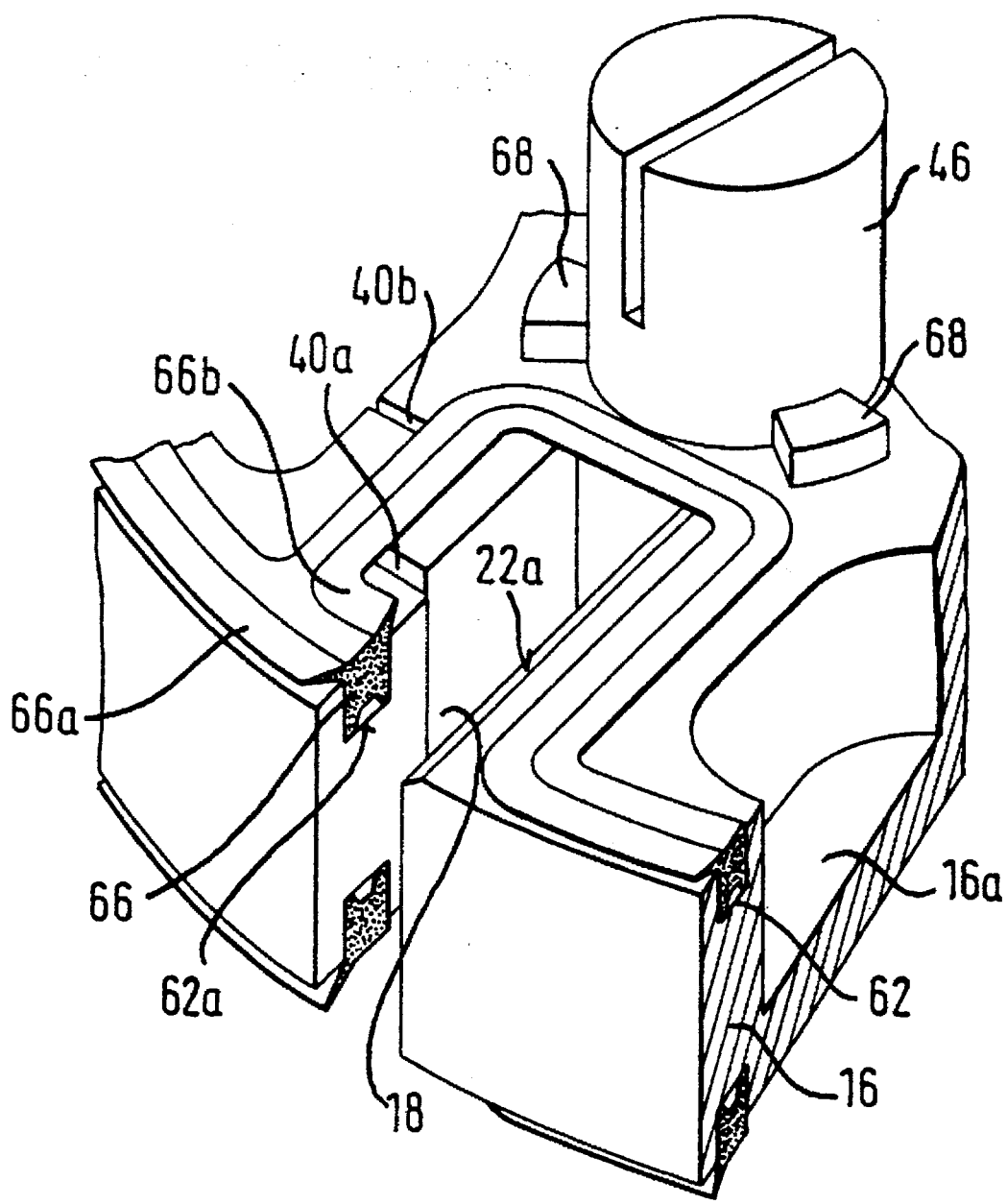

FIG. 13 hows a perspective view of part of a rotor with axial sealing lip means.

In all embodiments described herein the drive device is provided with a housing 12 which is fitted laterally to a belt retractor 10 and in which a cylinder space 14 is formed. In the cylinder space 14 a disk-like rotor 16 is eccentrically arranged and rotatably mounted. The rotor 16 is provided with a plurality of radial slots 18, wherein a respective lamella 20 is slidingly received.

Each of such slots 18 is connected at its radially inner end 18a via a flow duct 22 with the cylinder space 14.

In the cavity of a cube-like head 24 on the housing 12 a pyrotechnic gas generator 26 is arranged, which is provided with an electrical fuse. Via a duct 27 in the interior of the housing 12 the inner space of the hollow cylinder head 24 on the housing 12 is connected with the cylinder space 14. At its entry into the cylinder space 14 the duct 27 forms an inlet 28, which is generally diametrally opposite to an outlet 30 in the housing 12.

As in a conventional lamella motor between the rotor 16, the lamellas 20 and the wall of the cylinder space 14 working chambers able to be pressurized are formed, which owing to the eccentric arrangement of the rotor 16 are in a generally sickle-like configuration.

That lamella 20a which terminates the inlet side chamber 32 at its front end in terms of the direction of rotation of the rotor 16, is secured by a shear pin 34 to the housing 12 in an extended setting, in which its radially outer end is in sealing engagement with the wall of the housing 12. Since the rotor 16 is accordingly held on the housing 12 in such a manner as to prevent relative rotation, a coupling, as for example a ball overrun clutch 36 is provided to couple up the rotor 16 on activation of the drive device to a lateral coupling head 38 on the belt drum of the belt retractor 10.

On firing the gas generator 26 the gases produced by it firstly are introduced through the duct 27 and the inlet 28 into the chamber 32, where a high pressure becomes established. Via the flow duct 22 there is an equalization of pressure with respect to the radially inner end 18a of the respective slot, in which the lamella 20a is arranged. It is only when there has been a substantial pressure build-up of for instance 10% of the maximum value in the chamber 32, that the shear pin 34 will yield so that the rotor 16 is abruptly caused to rotate. Owing to the centrifugal force then becoming established the lamellas 20 are held in sealing engagement with the wall of the cylinder space 14. Owing to the incipient rotary movement of the rotor 16 the coupling 36 is simultaneously engaged and the belt drum of the belt retractor 10 is linked with the rotor 16 in such a manner as to prevent relative rotation. The rotor 16 will now perform the rotary movement necessary for drawing the belt webbing taut through 1 to 2 revolutions and preferably approximately 1.5 revolutions, within a time of approximately only 6 to 10 ms.

Figure 3:
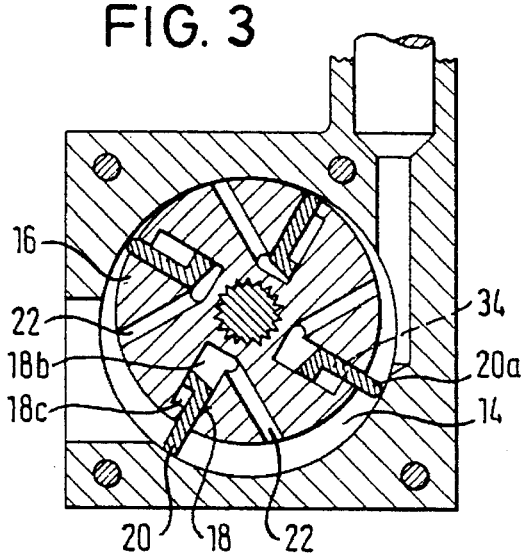
FIG. 3 shows a second embodiment of the drive device in a section taken through the rotor.

The number of lamellas may be greater than three and will for example amount to four, as in the embodiment depicted in FIG. 3. A further particular feature of this embodiment is that the lamellas 20 respectively have a greater thickness at their radially inner ends than at their radially outer ends, as illustrated in FIG. 9, and accordingly represent a larger effective pressure surface. Accordingly the slots 18 in the interior of the rotor 16 are made wide and form a pressure acting space 18b, into which a flow duct 22 opens which runs through the body of the rotor 16. With the lamella 20 retracted a narrow space 18c is formed between its thickened, radially inner end and the radially outer limiting surface of the slot 18; in such space 18c back pressure is established during outward motion of the lamella 20 to oppose the further movement of the lamella. Consequently this space 18c is connected by an equalizing groove 40 in the lateral surface of the rotor 16 with the rotor bearing region.

Figure 1:
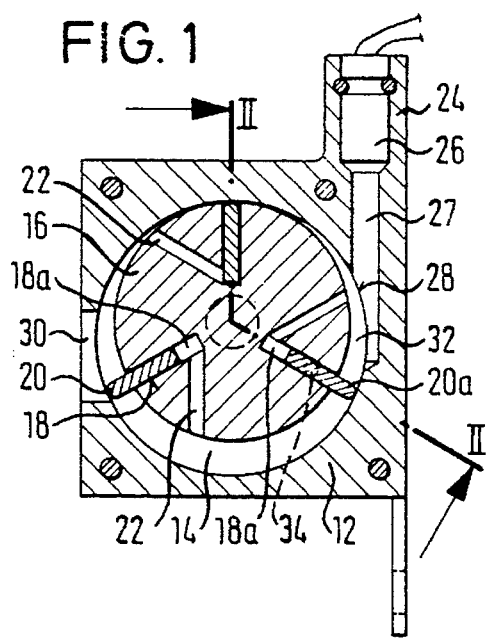
FIG. 1 shows a first embodiment of the drive device in a section taken through the rotor.
Figure 2:
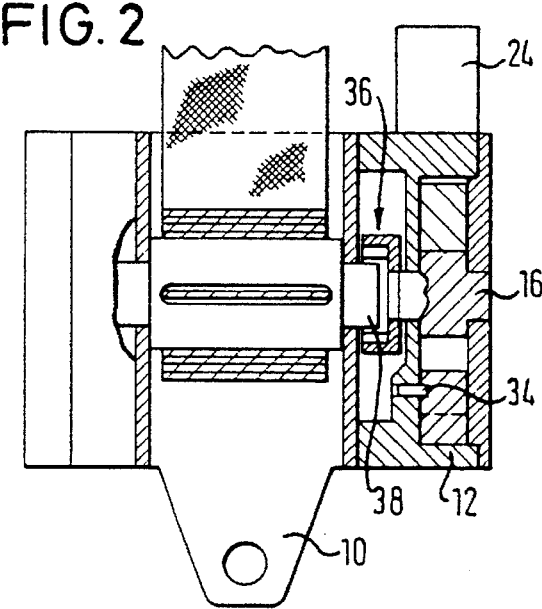
FIG. 2 is a sectional view taken on the line II—II of FIG. 1.
Figure 4:
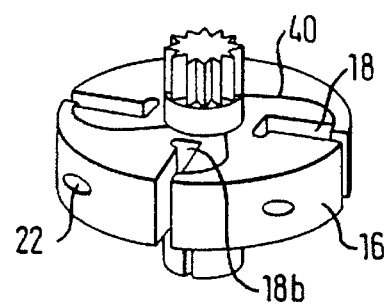
FIG. 4 is a perspective view of the rotor in the embodiment of FIG. 3.

In the case of the embodiment depicted in FIGS. 3 and 4 as well one of the lamellas, namely the lamella 20a, which terminates the inlet side chamber 32, is locked to the housing 12 by means of a shear pin 34. The manner of operation differs from that of the embodiment shown in FIGS. 1 and 2 only as regards the force differential employed for optimization of the sealing engagement of the lamellas on the wall of the cylinder space 14 owing to the different sizes of pressure loaded terminal surfaces on the lamellas.

Figure 5:
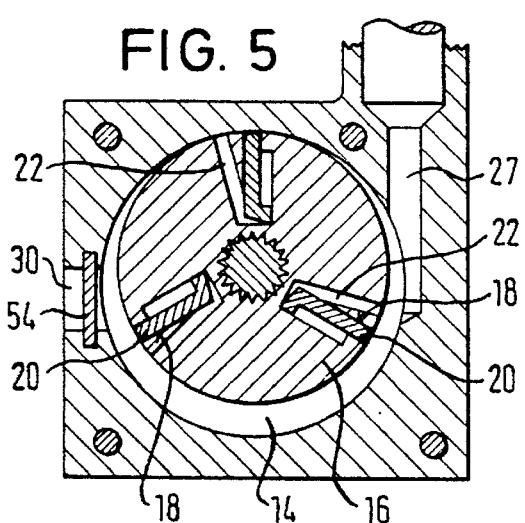
FIG. 5 is a sectional view of a still further embodiment of the drive device.
Figure 6:
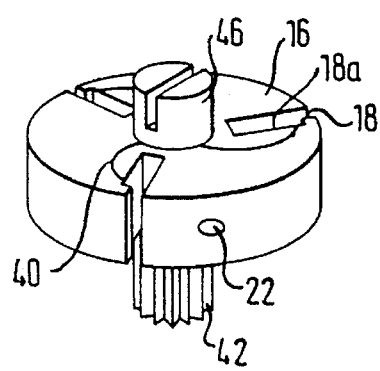
FIG. 6 is a perspective view of the rotor in the embodiment of FIG. 5.
Figure 7:
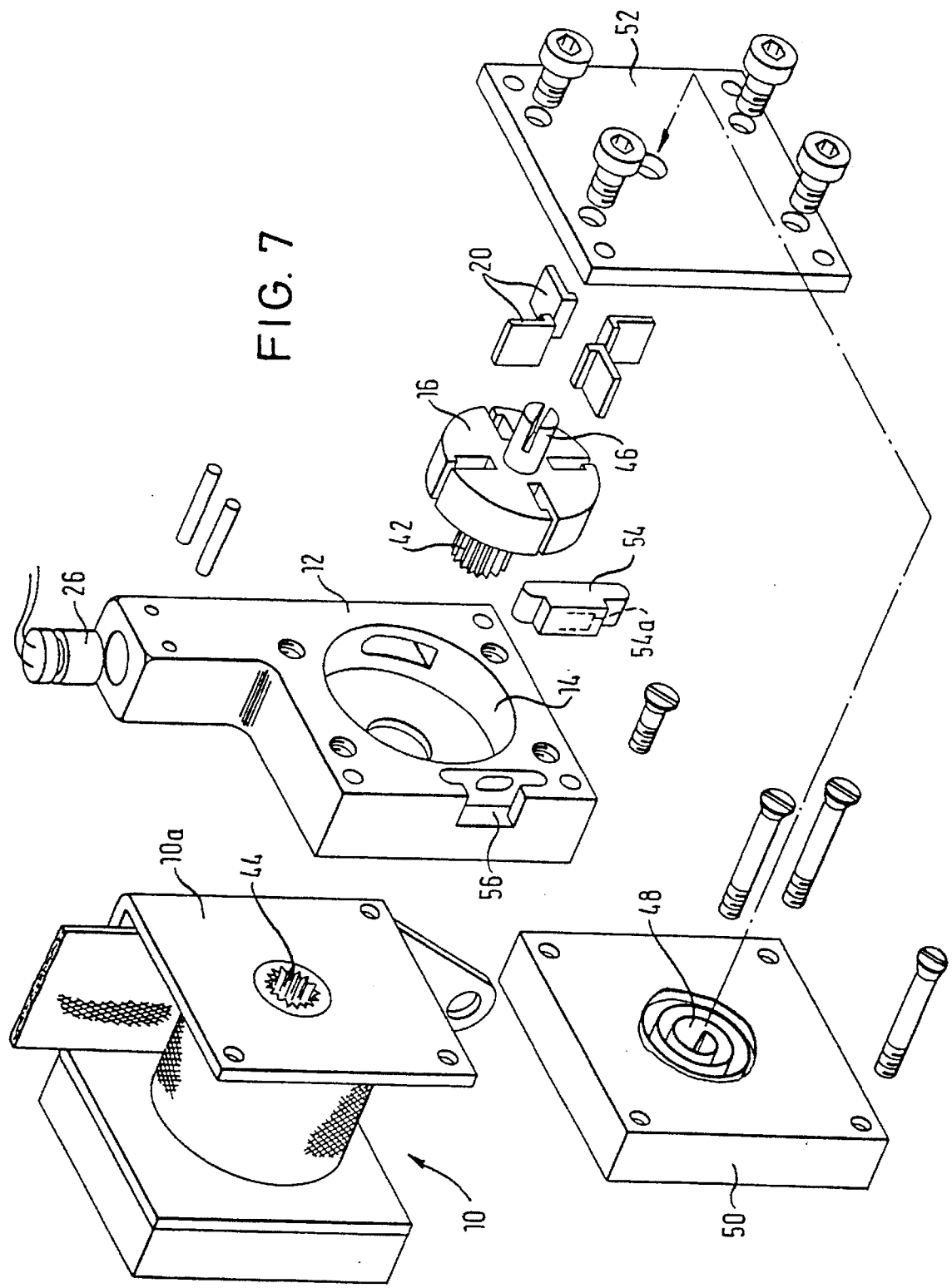
FIG. 7 is an exploded view of a further embodiment of the drive device with a belt retractor.

In the embodiment of FIGS. 5 and 6 the lamellas 20 are completely retracted within the slots 18, same not projecting past the periphery of the rotor 16. They are free of contact with the wall of the housing 12 so that the rotor 16 is able to be rotated without obstruction. In this embodiment the rotor 16 is directly connected, in such a manner as to prevent relative rotation, with the belt drum of the belt retractor 10. As shown in FIGS. 6 and 7, the rotor 16 possesses a pin 42 on its one side with splines for producing an interlocking connection with corresponding splines on a connection head 44 on the belt drum of the belt retractor 10, and furthermore a pin 46 on the opposite side for connection of the inner end of a spiral spring 48, which constitutes the wind up spring of the belt retractor 10. The housing 12 of the drive device is arranged between a side plate 10a of the belt retractor and a can 50, in which the spiral spring 48 is accommodated. A cover plate 52 shuts off the housing 12 on its side which faces the can 50.

In the case of the embodiment of FIGS. 5 and 7 the outlet 30 is closed by a blowout patch 54. In the case of this embodiment as well the lamellas 20 are thickened at their radially inner ends and the slots 18 are widened at their inner ends correspondingly. On activation of the gas generator the lamellas 20 do not initially define any chambers in the cylinder space 14. Since the outlet 30 is closed by the blowout patch 54, a back pressure will build up in the cylinder space 14, which will be transmitted via the flow ducts 22 into the widened pressure acting space 18b of each slot 18 as well and also behind the lamellas 20. Since the pressure acting surface on the inner end of each lamella is larger than at its radially outer end, the lamellas will now be shifted radially outward and into sealing engagement with the wall of the cylinder space 14. The blowout patch 54 will only clear the outlet 30 when a sufficiently high pressure has been built up in the interior of the cylinder space 14 to enable the lamellas to run into their completely extended settings. At this point in time the rotor 16 will be briskly caused to rotate, the radially outer ends of the lamellas 20 being held in sealing engagement with the wall of the cylinder space 14 both by the radial force differential and also by the centrifugal force now additionally acting.

As is indicated in FIG. 7 the blowout patch 54 can comprise a plastic part inserted in a recess 56 in the housing 12 and having a line of intentional weakness 54a therein.

In the case of the modified design illustrated in FIG. 8 of the drive device the outlet 30 is free, but however in the chamber defined between two lamellas 20d and 20e a filling plug 60 is arranged, which practically completely occupies the space in this chamber so that the flow path to the outlet 30 is greatly choked. The filling plug 60 consists of a deformable material and is caused by increasing pressure to move to the outlet 30. The filling plug 60 acts in a fashion similar to the blowout patch 54 in the previously described embodiment and produces, after activation of the gas generator, initially a back pressure, by which the lamellas 20 are thrust radially outward into sealing engagement with the wall of the cylinder space 14.

FIG. 9 shows a single lamella 20, whose radially inner end 201 possesses a thickened region so that here a surface 203 is produced, whose area is larger than at the opposite, radially outer end surface 205. In the lamella 20 a hole 207 is provided, into which the shear pin 34 fits as in the embodiment of FIG. 3.

In the modified design of a lamella 20, illustrated in FIG. 9a, a sealing strip 21 is inserted in the radially outer end thereof. This sealing strip 21 comprises a material, which by plastic deformation causes damping of the impact of the lamella against the wall of the cylinder space 14. A suitable material is for example aluminum. Owing to such damping rebound of the lamella from the wall of the cylinder space 14 is prevented.

In all embodiments described the rotor 16 is also sealed off in the axial direction in relation to the housing 12. FIG. 10 shows a side surface of the rotor 16 in an embodiment similar to that of FIG. 3, but however with only three lamellas. In a groove 62 having the form of a complete loop in the side surface of the rotor 16 a strip seal 64 is inserted, whose cross section is indicated in FIG. 12. It is a question of a so-called quad ring, which in cross section has four sealing beads set at an angle of 90° to one another. The groove 62 extends along the outer periphery of the rotor 16 and extends inward along each of the slots, around the same and then outward again along a path in the form of a complete loop. As shown in FIG. 12, the strip seal 64 extends to a small degree past the side surface of the rotor 16. When the housing 12 is shut it will be in sealing engagement with its side plates.

Between two respective adjacent slots 18 the rotor 16 is provided with a deep recess 16a to save weight, as is illustrated in FIG. 11.

For pressure equalization of the widened space 18c in each of the slots 18 toward the recess 16a such space 18c is connected via a transverse groove 40a with the floor of the groove 62 and from this point there leads a further transverse groove 40b to the recess 16a. Instead of a flow duct 22 leading through the rotor body, as in the embodiment of FIGS. 1 through 8, the high pressure side of each slot 18 is provided with a chamfer 22a, by which a flow duct with the same function is formed.

In all embodiments with a rotor able to turn freely in the housing and which is directly connected with the belt drum of the belt retractor, sealing of the rotor in the axial direction is performed by a lip seal, whose sealing lip firstly has to be brought into engagement with the side plates of the housing by the pressure produced by the gas generator. Such a lip seal is depicted by way of example in FIG. 13, where it is referenced 66. The lip seal 66 is, as in the previously described embodiment, a strip seal and is placed in a groove 62 forming a continuous loop in the side surface of the rotor 16. On the low pressure side of the slot 18 the groove 62 is extended into a region referenced 62a as far as the edge of the slot 18. In this region 62a the lip seal 66 is provided with two sealing lips 66a and 66b facing in opposite directions. The chamfer 22a is also clearly shown in FIG. 13, such chamfer forming a flow duct for pressurization of the space in each slot 18 behind the respective lamella. Furthermore in FIG. 13 the two transverse grooves 40a and 40b are depicted, which open at the floor of the groove 62 where the cross sectional configuration of the lip seal 66 with two spaced seal beads forms a flow duct.

The rotor 16 is centered by spacer humps 68 molded on its side surfaces between the side plates of the housing 12. The extension of the spacer humps 68 past the plane of the side surface of the rotor 16 is somewhat greater than that of the sealing lips 66a and 66b so that in the resting state same do not come into engagement with the side plates of the housing.

I claim:

1. A drive device for a belt pretensioner on a belt retractor which has a belt drum rotatably mounted in a frame, comprising a housing adapted to be laterally fitted to said frame, a cylindrical wall within said housing defining a cylinder space, said cylinder space being connected with a gas inlet, a circular rotor disk eccentrically mounted within said cylinder space and provided with radial slots, each of said slots slidably accommodating a lamella, a plurality of chambers being defined between said lamellas, said rotor disk and said cylindrical wall, each of said slots being connected at a radially end thereof with one of said chambers by a flow duct, and further comprising a compressed gas source adapted to introduce pressurized gas into said chambers at said gas inlet for driving said rotor disk in a predetermined direction of rotation, and a coupling selectively connecting said rotor disk to said belt drum, wherein one of said chambers which is adjacent to said gas inlet is closed at a forward end thereof with respect to said predetermined direction of rotation by a lamella which is held fixed on said housing and in sealing engagement with said cylindrical wall by holding means which yield only after a substantial amount of pressure is established in said chamber.

2. The drive device of claim 1, wherein said holding means is formed by a shear pin.

3. The drive device of claim 1, wherein said rotor disk has axial end faces provided with grooves for accommodation of seal strips.

4. The drive device of claim 3, wherein said grooves extend in a closed loop along an outer periphery of each axial end face and along each of said slots.

5. The drive device of claim 3, wherein said sealing strip has a cross section with four sealing beads spaced at 90° from each other.

6. The drive device of claim 3, wherein said sealing strip makes sealing contact with said lamellas on one side thereof.

7. The drive device of claim 1, wherein each of said lamellas has a radially outer end provided with a sealing strip.

8. A drive device for a belt pretensioner on a belt retractor which has a belt drum rotatably mounted in a frame, comprising a housing adapted to be laterally fitted to said frame, a cylindrical wall within said housing defining a cylinder space, said cylinder space being connected with a gas inlet and a gas outlet, a circular rotor disk eccentrically mounted within said cylinder space and connected with said belt drum for joint rotation, said rotor disk being provided with radial slots, each of said slots slidably accommodating a lamella, a plurality of chambers being defined between said lamellas, said rotor disk and said cylindrical wall, each of said slots being connected at a radially inner end thereof with one of said chambers by a flow duct, and further comprising a compressed gas source adapted to introduce pressurized gas into said chambers at said gas inlet for driving said rotor disk in a predetermined direction of rotation, and wherein each of said lamellas has a radially inner end face and a radially outer end face, said lamellas being held in a normal operating condition with said radially outer ends retracted from said cylindrical wall, said radially inner end faces of said lamellas having a larger area than said radially outer end faces, and an obstructing body being provided to obstruct flow of gas from said cylindrical space to said gas outlet.

9. The drive device of claim 8, wherein said obstructing body is formed by a blowout patch closing said gas outlet.

10. The drive device of claim 8, wherein said obstructing body is formed by at least one filling plug of a deformable material and located between said gas inlet and said gas outlet.

11. The drive device of claim 8, wherein each lamella has a radially outer end provided with a sealing strip.

12. The drive device of claim 11, wherein said sealing strip consists of a material adapted to damp abutment of said lamellas on said cylindrical wall by plastic deformation.

* * * * *